(No Model.) 2 Sheets—Sheet 1.
E. H. REYNOLDS.
AUTOMATIC GRAIN METER.
No. 404,225. Patented May 28, 1889.
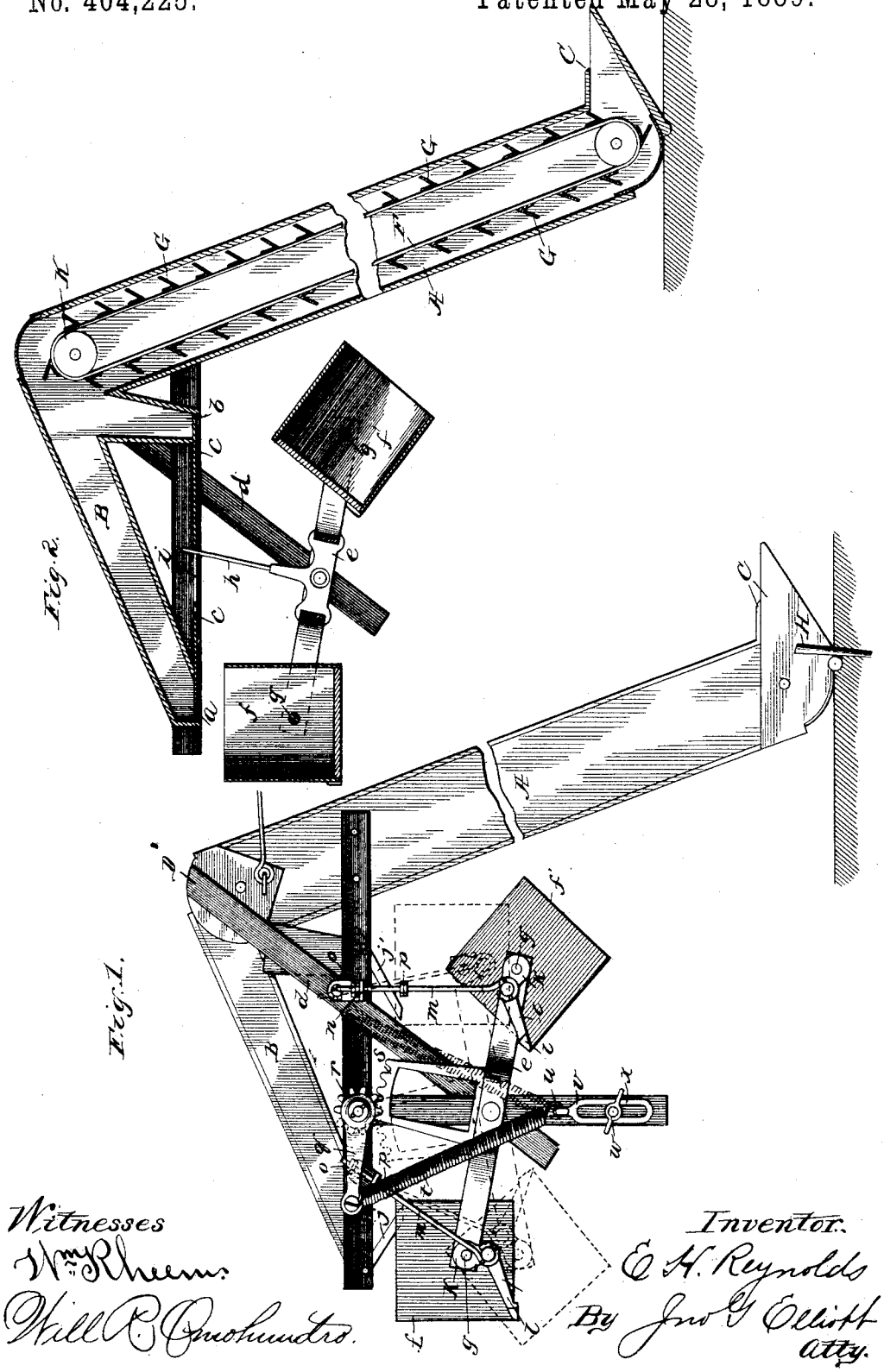
Witnesses
Wm Rheem
Will R. Onohundro
Inventor
E. H. Reynolds
By Jno G Elliott
Atty.

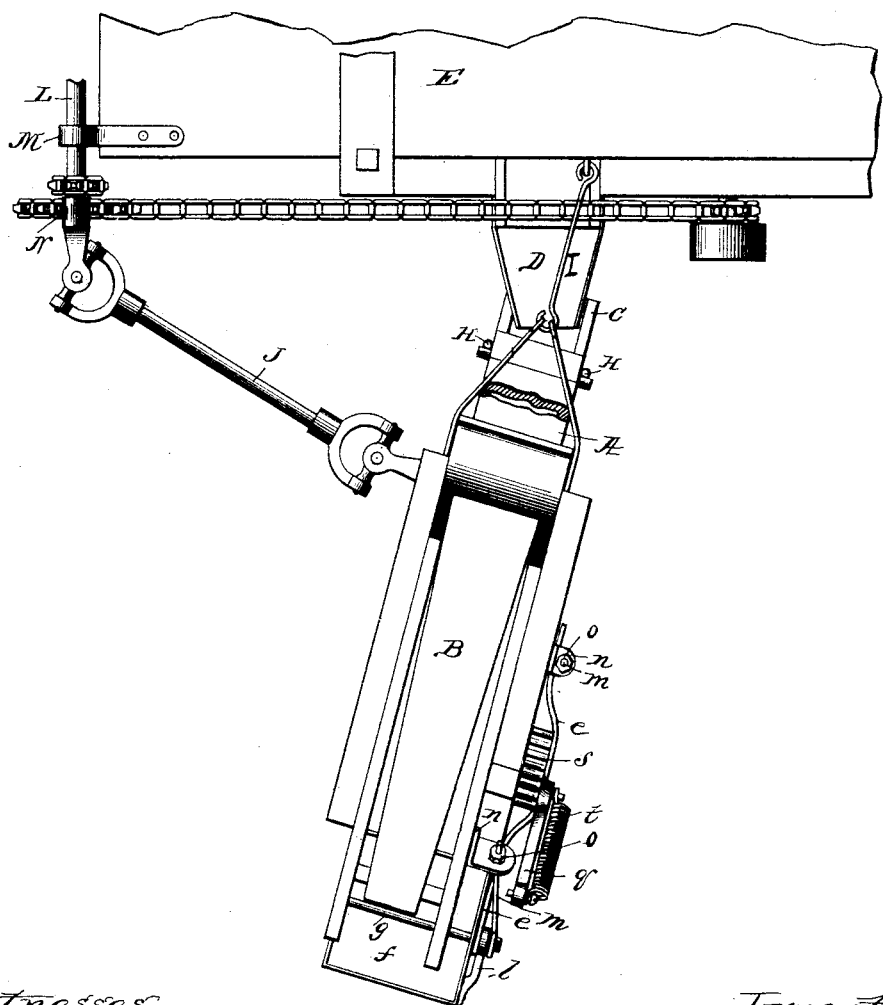

UNITED STATES PATENT OFFICE.

EARL HOUSTIN REYNOLDS, OF PROPHETSTOWN, ILLINOIS.

AUTOMATIC GRAIN-METER.

SPECIFICATION forming part of Letters Patent No. 404,225, dated May 28, 1889.

Application filed May 14, 1888. Serial No. 273,873. (No model.)

*To all whom it may concern:*

Be it known that I, EARL HOUSTIN REYNOLDS, a citizen of the United States, and a resident of Prophetstown, in the county of Whiteside and State of Illinois, have invented certain new and useful Improvements in Measures, of which the following is a specification.

This invention relates to improvements in measures adapted for grain, coal, potatoes, and other commodities, in which heretofore measures have been indirectly connected with the gate of the supply of the substance to be measured, so that as the measure moves away to discharge its contents such gate will be closed.

The prime object of this invention is to have the measure so supported that when actuated by the measured substance to close the feed-gate and move away therefrom the measure will dump and automatically discharge its contents.

Another object is to have an adjustable counter-balance for such a measure, so that the same quantity of different substances may be measured thereby, notwithstanding that the said substances may differ materially in weight.

A further object is to combine with an elevator-chute or other supply two or more measures so connected that when one has fed to it the desired measure or quantity the weight of the measured substance will cause said measure to automatically cut off the feed thereto and move away from the supply to discharge its contents and simultaneously therewith bring the other measure in position for filling and direct the feed thereto.

A further object is to combine with such measures a single slide actuated thereby and adapted and arranged to alternately cut off the feed to the different measures.

A still further object is to combine with an elevator-chute or other source of supply having two discharge-openings two measures pivotally supported beneath said openings in such manner that the gravity of the measured substance in one measure will cause the gate thereof to close and the said measure to move away from and dump its contents, and simultaneously therewith cause the other measure to rise up in position for filling and open the gate feeding thereto.

I attain these objects by the devices illustrated in the accompanying drawings, in which—

Figure 1 represents a side elevation of an elevator-chute having a measure applied thereto embodying my invention; Fig. 2, a central longitudinal section thereof, and Fig. 3 a plan view showing the manner of embodying my invention in connection with a thrashing-machine.

A measuring device of the character hereinafter described is equally adapted for measuring grain, coal, potatoes, or any other commodity or substance of which it is desirable to ascertain the quantity in bushels or like standards of measurement, rather than the weight thereof, but for convenience of description is herein illustrated and described in the form of a grain-measure for use in connection with a thrashing-machine, to which use it is particularly adapted.

Similar letters of reference indicate the same parts in the several figures of the drawings.

Referring by letter to the accompanying drawings, A indicates an elevating-chute of any ordinary construction provided with the discharge-spout B and receiver or hopper C, into which latter the grain runs from the spout D of the thrashing-machine E, (see Fig. 3,) and from whence it is carried up to the discharge-spout by means of the elevating-apron F, to which latter is attached buckets G at regular intervals. This elevator as a whole is particularly designed for use in connection with a thrashing-machine, and when so used is held in the inclined position shown in Figs. 1 and 2 by resting the hopper end thereof upon the ground against stake-pins H, immediately under the discharge-spout D of the thrashing-machine, and connecting the upper end of the elevator with the machine by means of the guy-rods I or in any other suitable manner, so that the elevator stands out from the machine at an oblique angle, as shown in Fig. 3. In this oblique position the elevating-apron may be driven by means of a flexible shaft, J, of ordinary construction, which, preferably, attaches to the shaft of the upper pulley, K, at one end, and at its opposite end to a supplemental cross-shaft, L, journaled in suitable brackets, M, at the rear upper end of the thrashing-machine, to which power is communicated from the stacker or straw-carrier shaft N by a chain and sprocket-wheel connection, or it may be derived from any other available source, which, however, should be capable of use from either side of the machine, as my elevator is intended to be placed on whichever side of the machine is most convenient. The spout of the elevator projects therefrom at such an angle as facilitates the flow of grain therefrom, and is provided with two discharge-openings, $a$ $b$, covered by a slide-gate, $c$, operated in the manner hereinafter described to alternately close said openings, and thereby produce an alternate feed through said openings. Pivoted to said spout, upon depending arms $d$, about midway between and in a plane below the discharge-openings thereof, is a rocking frame, $e$, the ends of which are bifurcated or otherwise adapted to receive the measures $f$ $f'$, pivoted thereto at $g$, so as to come immediately under the discharge-openings in the spout, and from said frame, at the center of length thereof, projects upwardly a bar or finger, $h$, the free end of which works in an elongated slot, $i$, in the slide-gate $c$ in such manner as to operate the gate to close the opening to the lowered measure and simultaneously open the other discharge-opening to the raised measure and direct the feed thereto. These measures $f$ and $f'$ are pivoted to the rocking frame at a point a little below their center of height and inside the center of width thereof, so as to render the measure top-heavy, and therefore inclined to tilt and dump outwardly, which tendency, however, is controlled, when the measure is raised and being filled, by means of stops $j$ $j'$, pivoted to a stationary portion of the chute-frame in such manner that the free end thereof will be lifted up by the measure and then drop down and bear against the inside of the measure, as clearly shown in Fig. 1.

The dumping of the measures and also their return to a normal upright position is positively accomplished by means of crank-arms K, secured to one of the pivots $g$ of the measures and provided with extensions or arms $l$, the ends of which are attached to the bottom of the measures at or near the outside corners thereof. To these crank-arms are pivotally connected one end of rods $m$, the opposite ends of which work loosely through eyes $n$, pivotally secured to a stationary portion of the chute-frame, and are screw-threaded for the reception of the adjustable stop-nuts $o$ $p$, located one on each side of said eyes, and hence as the filled measure descends it will remain substantially in an upright position, being so held by the stop $j$ until the nut above the eye comes into engagement with the said eye, when the measure will be forcibly tilted or dumped outwardly, and this action will be exactly reversed in returning the measure to its elevated upright position by the lower stop-nut engaging the eye before the upward movement of the measure is completed and forcibly returning the same to its normal upright position.

The purpose of the lost motion of the rod through the eye—that is, the interval of movement in either direction before the nuts thereon engage the eye—is to permit the empty and inverted measure to be righted after the filled and descending measure has cleared the stop, but before the dumping thereof, at which time the resistance offered thereby will have the least effect upon the descending filled measure, and not increase the amount of grain necessary to merely elevate said measure and overcome the force of controlling devices described further on. In this connection I may state that the actuation of the slide-gate of the discharge-openings is likewise accomplished by a single short stroke, the feed to the descending filled measure continuing until just prior to its dumping, at which time it is abruptly cut off and the gate feeding to the other measure opened simultaneously therewith, by which time the empty and rising measure will have been righted to receive the feed therein.

While the crank-arms and connecting-rods will aid the dumping of the filled measure, the main purpose for which they are employed is to right the inverted measure, for with the measures pivoted off the center the gravity thereof will cause them to dump without any such means being employed.

The controlling or counterbalancing devices before referred to, by means of which the same quantity of grains or other substances differing materially in weight may be measured, consists of a crank-arm, $q$, journaled in the chute-frame in a vertical line above the pivot of the rocking frame, to the journaled end of which and concentric with the axis thereof is cast or otherwise secured a small cog-wheel, $r$, with which meshes a toothed segmental rack, $s$, rigidly secured to the said rocking frame, the teeth of which are formed on the arc of a circle struck from the axis of said frame, and therefore at all times in mesh with said cog-wheel.

To the opposite end of the crank-arm is secured one end of a coil-spring, $t$, the other end of which is secured to an eye or hook, $u$, on a plate, $v$, the latter being fastened to the chute-frame at a point below but in a line with the axes of the said crank and rocking frame, and made adjustable by means of a bolt, $w$, secured to the chute-frame and working through an elongated slot, $x$, in said plate. These devices are so arranged that when the rocking frame is at one end of its stroke the crank-arm and spring will be at one side of the center, and the tensions of said spring therefore opposed to the movement of the frame in the opposite direction; but when the rocking frame, actuated by the filling or filled measure, is forced to move in the opposite direction, and thereby, through the medium of the segment-rack, cause a corresponding movement of the crank-arm, the spring will gradually yield, but with increasing tension, until the crank-arm passes the dead-center, after which the contractile force of the spring will materially aid the further movement of the rocking-frame. The movement of these parts is so timed that it is just after the crank-arm passes the dead-center that the righting of the rising measure takes place, and the force of the spring will therefore supply all the necessary power to accomplish that end. Thus it will be seen that the force of this spring is the sole power which determines the quantity of grain or other substance to be measured, for the measures themselves just balance each other and therefore have no effect, and that by adjusting said spring so as to increase or decrease the tension or resistance thereof the same quantity of grains or other substances, varying considerably in weight, may be measured—that is to say, a bushel of wheat or a bushel of oats or timothy may be measured in the same-sized measures by merely adjusting the tension of the controlling-spring, although there is considerable difference in the weight of these grains.

In conclusion, I may state that my invention, broadly, is not limited to a spring as the controlling or counterbalancing force, for a weight or weights might obviously be employed and effect the same result; nor is it essential that the measures should tilt or dump in emptying so long as they move away from the gates and discharge their contents, and, indeed, only one measure need be employed; but such construction is illustrated as one and the preferred way of carrying out my invention.

Having described my invention, what I claim, and desire to secure by Letters Patent, is—

1. The measure, a pivotal support therefor, and a pivot-connection between said measure and support to one side of and below the center of said measure, in combination with a stop for maintaining the measure in an upright position when elevated, an adjustable counter-balance for said measure, and a rack-and-gear connection between said counter-balance and the support of the measure, substantially as described.

2. The measure, a pivotal support therefor, and a pivot-connection between said measure and support to one side of and below the center of said measure, in combination with an adjustable counter-balance for said measure, a rack-and-gear connection between said counter-balance and support, and a stop for maintaining it in position when elevated, substantially as described.

3. The chute, the measure, a pivotal support therefor, and a pivot-connection between said measure and support to one side of and below the center of said measure, in combination with a crank-arm on the pivot of said measure, a rod-and-stop connection between said arm and the chute-frame, a stop for maintaining said measure in an upright position when elevated, and a counter-balance for said measure, substantially as described.

4. The chute, the measure, a pivotal support therefor, and a pivot-connection between said measure and support to one side of and below the center of said measure, in combination with a crank-arm on the pivot of said measure, an eye on the chute-frame, a rod secured at one end to said crank-arm and having its free end working through said eye, stop-nuts on said rod on each side of said eye, a stop for maintaining said measure in an upright position when elevated, and a counter-balance for said measure, substantially as described.

5. The measure, a support therefor, and a pivotal bearing for said support, in combination with a crank-arm, a journal therefor, a rack-and-gear connection between one end of said arm and the support, and a counterbalance spring or weight secured to the other end of said crank-arm, substantially as described.

6. The measure, a support therefor, a pivotal bearing for said support, and a toothed rack secured to said support, in combination with a crank-arm, a journal therefor, a gear on the journaled end thereof engaging said rack, and a spring having one end secured to the other end of said crank-arm and fixed at its opposite end, substantially as described.

7. A chute provided with two discharge-openings, a rocking frame pivotally supported from said chute, two measures supported by said frame, and a rack secured to said frame, in combination with a crank-arm journaled at one end in the chute-frame, a gear thereon meshing with said rack, and a counterbalance spring or weight secured to said crank-arm, substantially as described.

8. A chute provided with two discharge-openings, a rocking frame pivotally supported from said chute, two measures supported by said frame, and a rack secured to said frame, in combination with a crank-arm journaled at one end in the chute-frame, a gear thereon meshing with said rack, and a spring secured at one end to said crank-arm and at its opposite end to the chute-frame, substantially as described.

9. A chute-frame provided with two discharge-openings, a rocking frame journaled thereto, and two measures supported thereby under said openings, in combination with a counter-balance alternately opposed to said measures, a slide-gate arranged to alternately close said discharge-openings, provided with an elongated slot, and a rod or finger projecting from said rocking frame and engaging the slot in said slide-gate, substantially as described.

10. A chute-frame provided with two discharge-openings, a rocking frame journaled thereto, two measures pivotally supported in said rocking frame to opposite sides of and below their centers, and a counter-balance alternately opposed to said measures, in combination with crank-arms on the pivots of said measures, eyes on the chute-frame, rods secured at one end to said crank-arms and having their opposite ends working through said eyes, stop-nuts on said rods to one or both sides of said eyes, and a stop for maintaining said measures in an upright position when elevated, substantially as described.

11. A chute-frame provided with two discharge-openings, a rocking frame journaled thereto, a slide-gate arranged to alternately close said openings, actuated by said rocking frame, two measures pivotally supported in said rocking frame to opposite sides of and below their centers, and a counter-balance alternately opposed to said measures, in combination with crank-arms on the pivots of said measures, eyes on the chute-frame, rods secured at one end to said crank-arms and having their opposite ends working through said eyes, stop-nuts on said rods to one or both sides of said eyes, and a stop for maintaining said measures in an upright position when elevated, substantially as described.

EARL HOUSTIN REYNOLDS.

Witnesses:
WILL R. OMOHUNDRO,
ALBERT M. BENNETT.